(12) United States Patent
Ngiau

(10) Patent No.: US 8,439,444 B2
(45) Date of Patent: May 14, 2013

(54) TIP SLIDE STOW SEAT

(75) Inventor: Christopher Ngiau, Wolverine Lake, MI (US)

(73) Assignee: Magna Seating Inc., Aurora, Ontario (CA)

( * ) Notice: Subject to any disclaimer, the term of this patent is extended or adjusted under 35 U.S.C. 154(b) by 194 days.

(21) Appl. No.: 13/057,486

(22) PCT Filed: Aug. 6, 2009

(86) PCT No.: PCT/CA2009/001107
§ 371 (c)(1), (2), (4) Date: Feb. 4, 2011

(87) PCT Pub. No.: WO2010/015088
PCT Pub. Date: Feb. 11, 2010

(65) Prior Publication Data
US 2011/0133534 A1    Jun. 9, 2011

Related U.S. Application Data

(60) Provisional application No. 61/086,936, filed on Aug. 7, 2008.

(51) Int. Cl.
| B60N 2/00 | (2006.01) |
| B60N 2/02 | (2006.01) |
| B60N 2/06 | (2006.01) |
| B60N 2/08 | (2006.01) |
| B60N 2/20 | (2006.01) |
| B60N 2/30 | (2006.01) |

(52) U.S. Cl.
USPC .................. 297/378.12; 297/331; 297/334

(58) Field of Classification Search .................. 297/331, 297/332, 334, 378.12
See application file for complete search history.

(56) References Cited

U.S. PATENT DOCUMENTS

| 3,580,635 | A | * | 5/1971 | Posh | 297/378.12 X |
| 3,814,476 | A | | 6/1974 | Abbott | |
| 3,973,288 | A | * | 8/1976 | Pickles | 297/378.12 X |
| 4,076,309 | A | * | 2/1978 | Chekirda et al. | 297/378.12 X |
| 4,147,386 | A | * | 4/1979 | Stolper | 297/378.12 X |
| 4,178,037 | A | * | 12/1979 | Pickles | 297/378.12 X |
| 4,219,234 | A | * | 8/1980 | Bell | 297/378.12 X |

(Continued)

FOREIGN PATENT DOCUMENTS

| CA | 2289839 A1 | 12/1998 |
| CA | 2316259 A1 | 8/1999 |
| CA | 2582892 A1 | 9/2007 |

*Primary Examiner* — Rodney B White
(74) *Attorney, Agent, or Firm* — Miller Canfield

(57) ABSTRACT

A seat assembly (10) includes a recliner assembly (30) operatively coupled between a seat back (12) and a seat cushion (14) for pivotal movement between a plurality of reclined seating positions and fold-flat position. A track assembly (58) operable between a locked condition and an unlocked condition allowing forward and rearward movement of said seat assembly. A stop member (54) fixedly secured to the seat cushion engages the seat back to limit forward pivotal movement. A trigger mechanism (56) pivotally coupled to said seat cushion and operatively coupled to said track assembly for releasing said track from said locked condition to said unlocked condition in response to pivoting said seat back to the fold-flat position. A pin mechanism (80, 82) slidably coupled to the seat back moves between an extended position engageable with the trigger mechanism and the stop member, and a retracted position allowing the forward pivotal movement of the seat back to the fold-flat position.

14 Claims, 8 Drawing Sheets

U.S. PATENT DOCUMENTS

| | | | |
|---|---|---|---|
| 4,243,264 A * | 1/1981 | Bell | 297/378.12 X |
| 4,279,442 A * | 7/1981 | Bell | 297/378.12 X |
| 4,295,682 A * | 10/1981 | Kluting et al. | 297/378.12 X |
| 4,372,610 A * | 2/1983 | Fisher et al. | 297/378.12 X |
| 4,382,630 A * | 5/1983 | Weston | 297/378.12 X |
| 4,629,252 A * | 12/1986 | Myers et al. | 297/378.12 X |
| 4,707,030 A | 11/1987 | Harding | |
| 4,846,526 A * | 7/1989 | Allen | 297/378.12 X |
| 4,997,223 A * | 3/1991 | Croft | 297/378.12 X |
| 5,161,856 A * | 11/1992 | Nishino | 297/378.12 X |
| 5,240,309 A * | 8/1993 | Kojer | 297/378.12 |
| 5,597,206 A | 1/1997 | Ainsworth et al. | |
| 5,951,108 A * | 9/1999 | Bauer et al. | 297/378.12 |
| 6,139,104 A * | 10/2000 | Brewer | 297/378.12 X |
| 6,152,533 A * | 11/2000 | Smuk | 297/378.12 X |
| 6,209,955 B1 * | 4/2001 | Seibold | 297/378.12 X |
| 6,336,679 B1 | 1/2002 | Smuk | |
| 6,341,819 B1 | 1/2002 | Kojima et al. | |
| 6,663,180 B2 * | 12/2003 | LeTournoux | 297/378.12 |
| 6,736,461 B2 | 5/2004 | Blair et al. | |
| 6,968,598 B2 * | 11/2005 | Becker et al. | 297/378.12 X |
| 6,986,551 B2 | 1/2006 | Ohba | |
| 7,152,923 B2 | 12/2006 | Charras | |
| 7,374,244 B2 * | 5/2008 | Becker et al. | 297/378.12 X |
| 7,517,022 B2 * | 4/2009 | Habedank et al. | 297/378.12 |
| 7,543,890 B1 * | 6/2009 | Sasaki et al. | 297/378.12 |
| 7,695,058 B2 * | 4/2010 | Satta et al. | 297/331 X |
| 7,971,938 B2 | 7/2011 | Wieclawski | 297/378.12 |
| 2002/0125757 A1 * | 9/2002 | LeTournoux | 297/378.12 |
| 2007/0018492 A1 * | 1/2007 | Becker et al. | 297/378.12 |
| 2007/0063565 A1 * | 3/2007 | Habedank et al. | 297/341 |

* cited by examiner

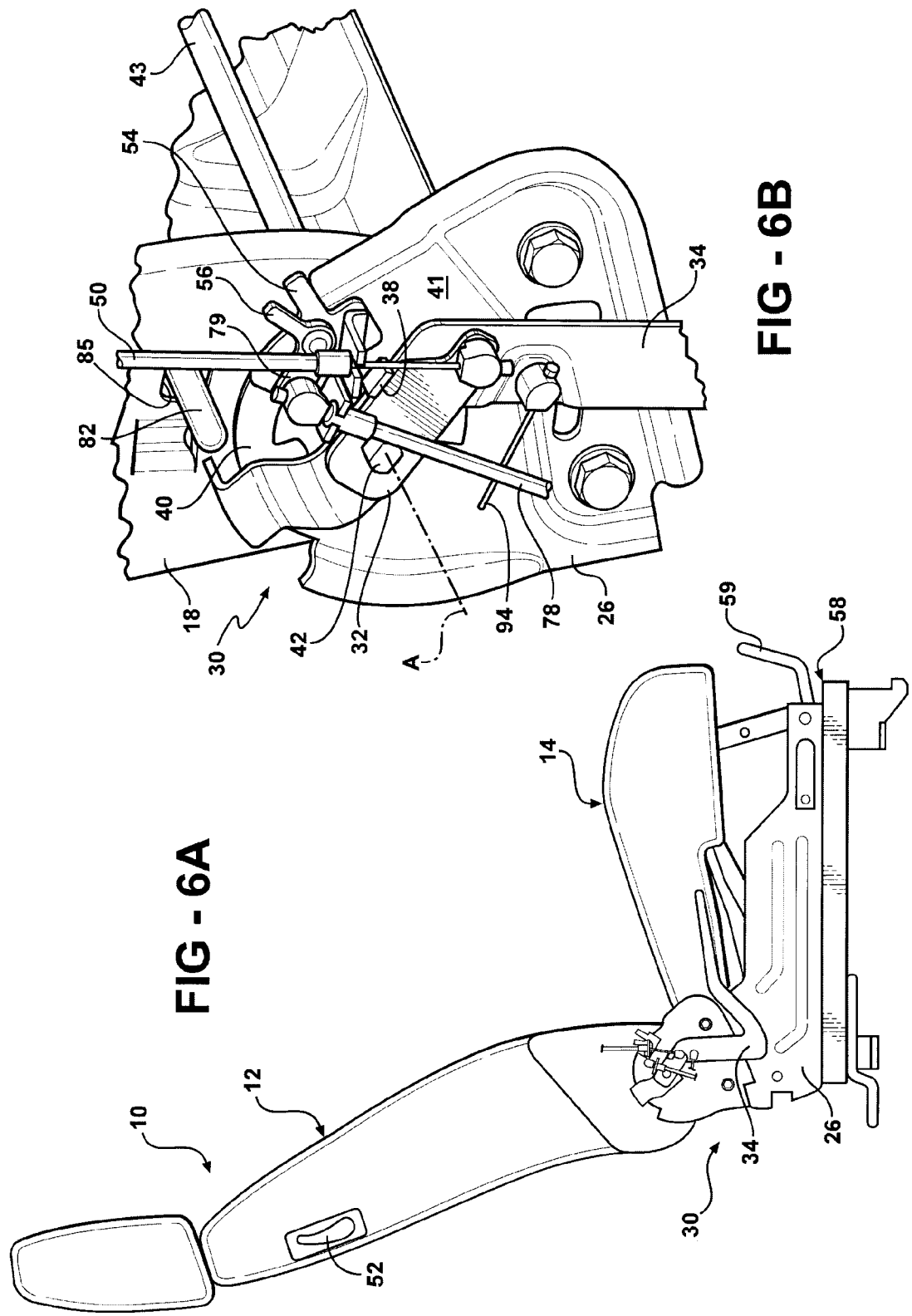

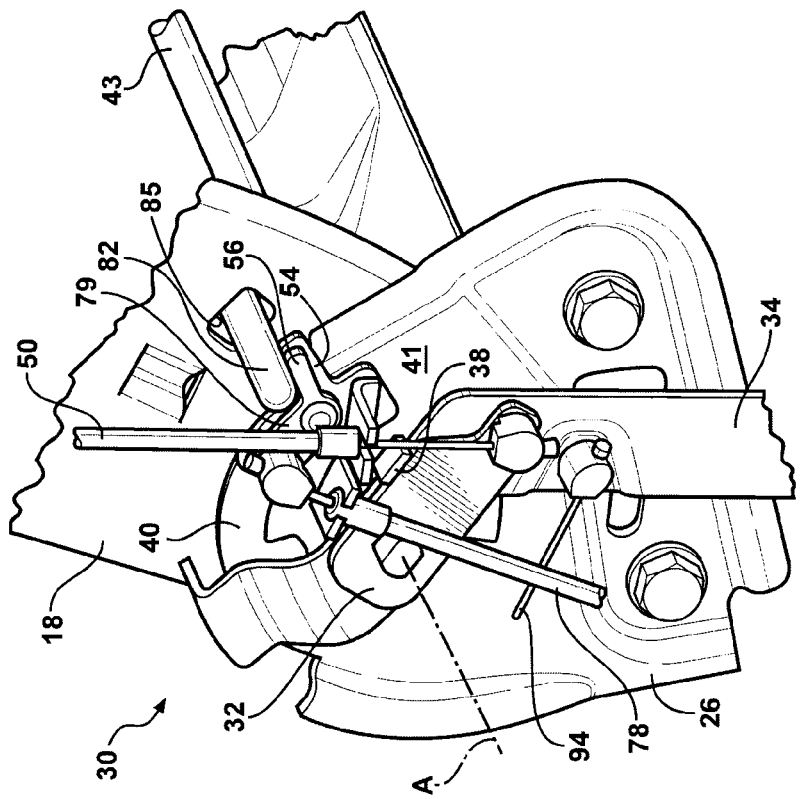
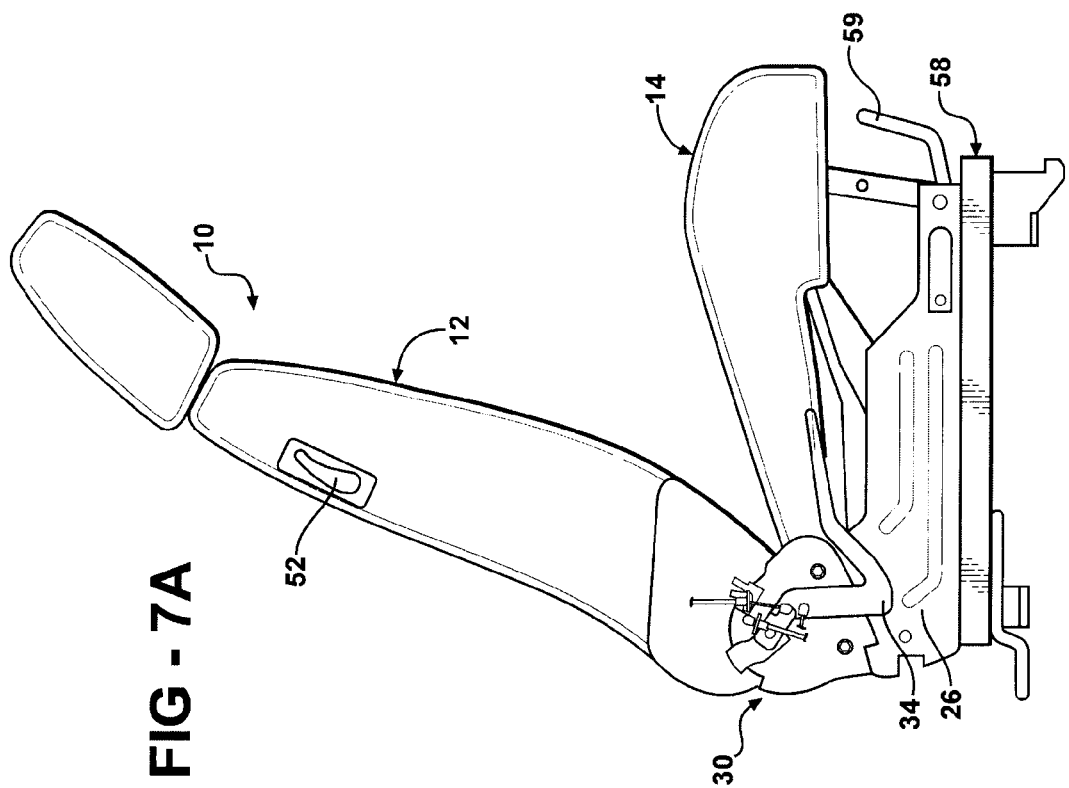

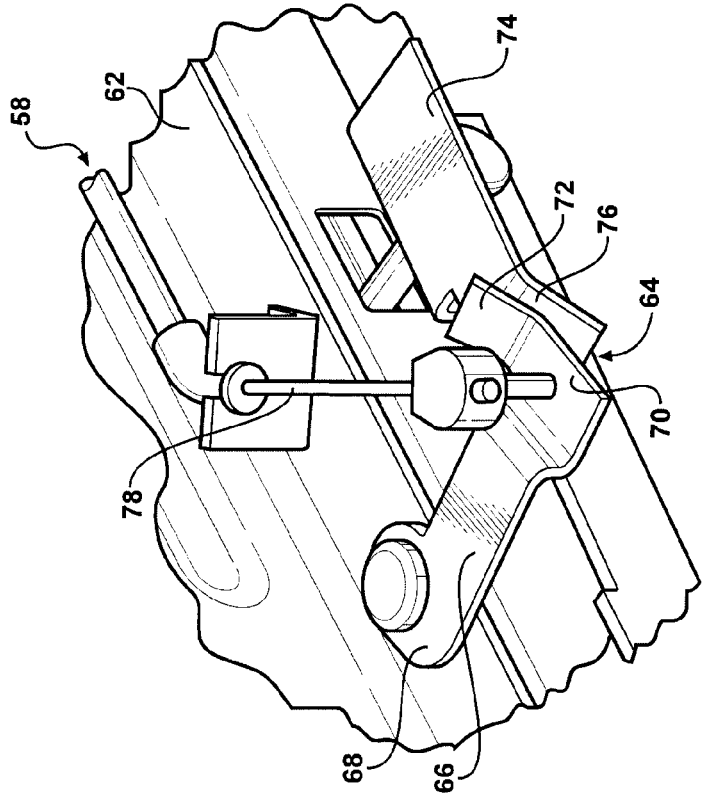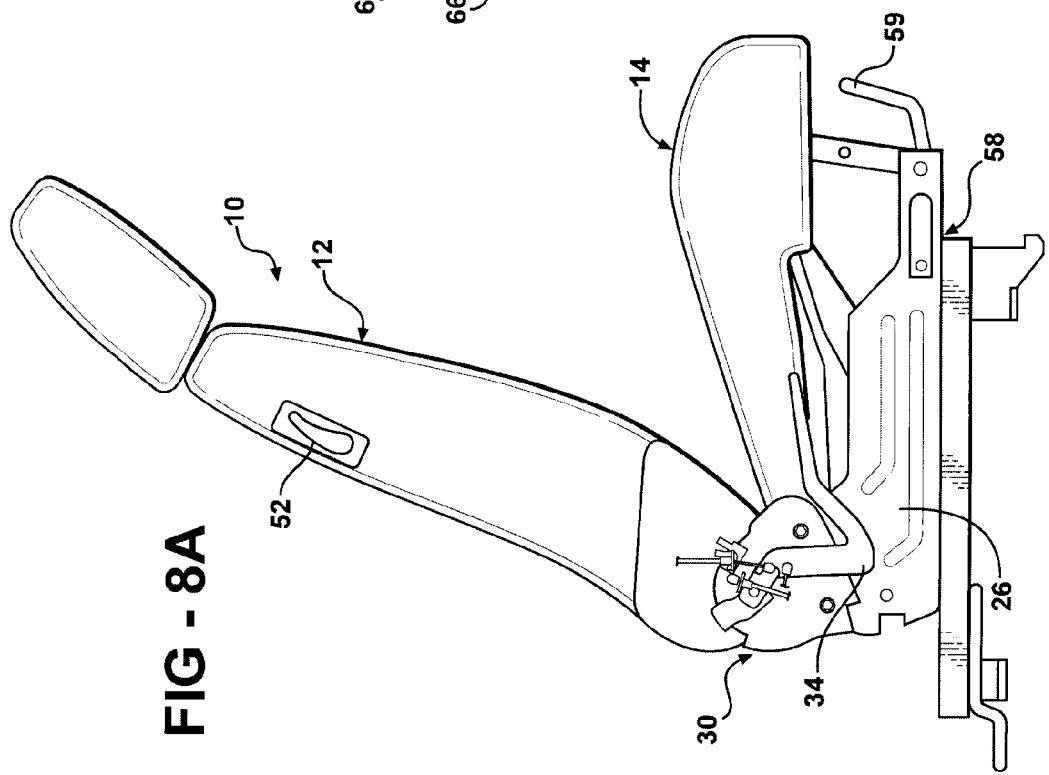

TIP SLIDE STOW SEAT

CROSS-REFERENCE TO RELATED APPLICATION

This application claims priority to and all the benefits of U.S. Provisional Application No. 61/087,346, filed on Aug. 8, 2008 and entitled "Tip Slide Stow Seat."

BACKGROUND OF THE INVENTION

1. Field of the Invention

The invention relates to a seat assembly for an automotive vehicle. More particularly, the invention relates to a seat assembly having a seat back pivotal between a plurality of reclined seating positions, a forward tip-slide position and a fold-flat position wherein the seat back automatically triggers a track assembly to move the seat assembly to a forward position in response to pivoting the seat back to the forward tip-slide position.

2. Description of Related Art

Passenger vehicles are known to have seat assemblies with seat backs that may be selectively reclined through a range of seating positions and that may be pivoted forward to a fold-flat position. In addition, it is known for passenger vehicles to have front seat assemblies with dumping and forward translation capabilities to temporarily provide space behind the front seat assembly to allow ingress and egress of passengers occupying a rear seat assembly. This feature is typically referred to as an easy entry or "E-Z entry" feature, which is common in smaller cars and is well known in the seating art. For example, U.S. Pat. No. 6,736,461 to Blair et al., issued May 18, 2004 discloses a vehicle seat assembly including a seat cushion, a seat back, and a rotary recliner for selective pivotal movement of the seat back relative to the seat cushion about a pivot axis (A-A) within a range of angular positions, including a tip-slide position and a fold-flat position.

It is desirable to provide an improved seat assembly having a recliner assembly adapted for selectively controlling pivotal movement of a seat back relative to a seat cushion between a plurality of seating positions, a forward tip-slide position, and a fold-flat position. It is also desirable to provide a seat assembly having a trigger mechanism for automatically releasing a track assembly to move the seat assembly to a forward position in response to pivoting the seat back to a forward tip-slide position.

SUMMARY OF THE INVENTION

According to one aspect of the invention, a seat assembly includes a seat back coupled to a seat cushion for pivotal movement relative to the seat cushion between a plurality of reclined seating positions and a forwardly folded position. A track assembly is adapted to be mounted to a floor and coupled to the seat cushion. The track assembly is operable between a locked condition and an unlocked condition allowing forward and rearward movement of the seat assembly. A recliner assembly is operatively coupled between the seat back and the seat cushion. The recliner assembly controls the pivotal movement of the seat back relative to the seat cushion. A stop member is fixedly secured to the seat cushion. The stop member engages the seat back to limit forward pivotal movement of the seat back thereby defining the forwardly folded position. A trigger mechanism is pivotally coupled to the seat cushion and is operatively coupled to the track assembly. The seat back actuates the trigger mechanism to release the track assembly from the locked condition to the unlocked condition in response to pivoting the seat back to the forwardly folded position, wherein actuating the track assembly to the unlocked condition urges the seat assembly to a forward position.

According to another aspect of the invention, a seat assembly includes a seat back coupled to a seat cushion for pivotal movement relative to the seat cushion between a plurality of reclined seating positions and a fold-flat position overlaying the seat cushion. A recliner assembly is operatively coupled between the seat back and the seat cushion. The recliner assembly controls the pivotal movement of the seat back relative to the seat cushion. A stop member is fixedly secured to the seat cushion. The stop member engages the seat back to limit forward pivotal movement of the seat back thereby defining a forwardly folded position between the plurality of reclined seating positions and the fold-flat position. A pin mechanism includes a pin slidably coupled to the seat back. The pin is movable between an extended position which engages with the stop member to arrest the forward pivotal movement of the seat back in the forwardly folded position and a retracted position allowing the forward pivotal movement of the seat back to the fold-flat position.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 6A is a side view of the seat assembly with the seat back in the upright seating position;

FIG. 6B is a fragmentary, perspective view of the seat assembly illustrating the recliner assembly when the pin is in the extended position;

FIG. 7A is a side view of the seat assembly with the seat back in a forward tip-slide position;

FIG. 7B is a fragmentary, perspective view of the seat assembly illustrating the recliner assembly when the pin is in the extended position and the seat back is in the forward tip-slide position;

FIG. 8A is a side view of the seat assembly in a forward position and the seat back in the forward tip-slide position;

FIG. 8B is a fragmentary, perspective view of the track assembly illustrating the track release system when the track assembly is in an unlocked condition.

DETAILED DESCRIPTION OF THE EMBODIMENTS

Figure 1:
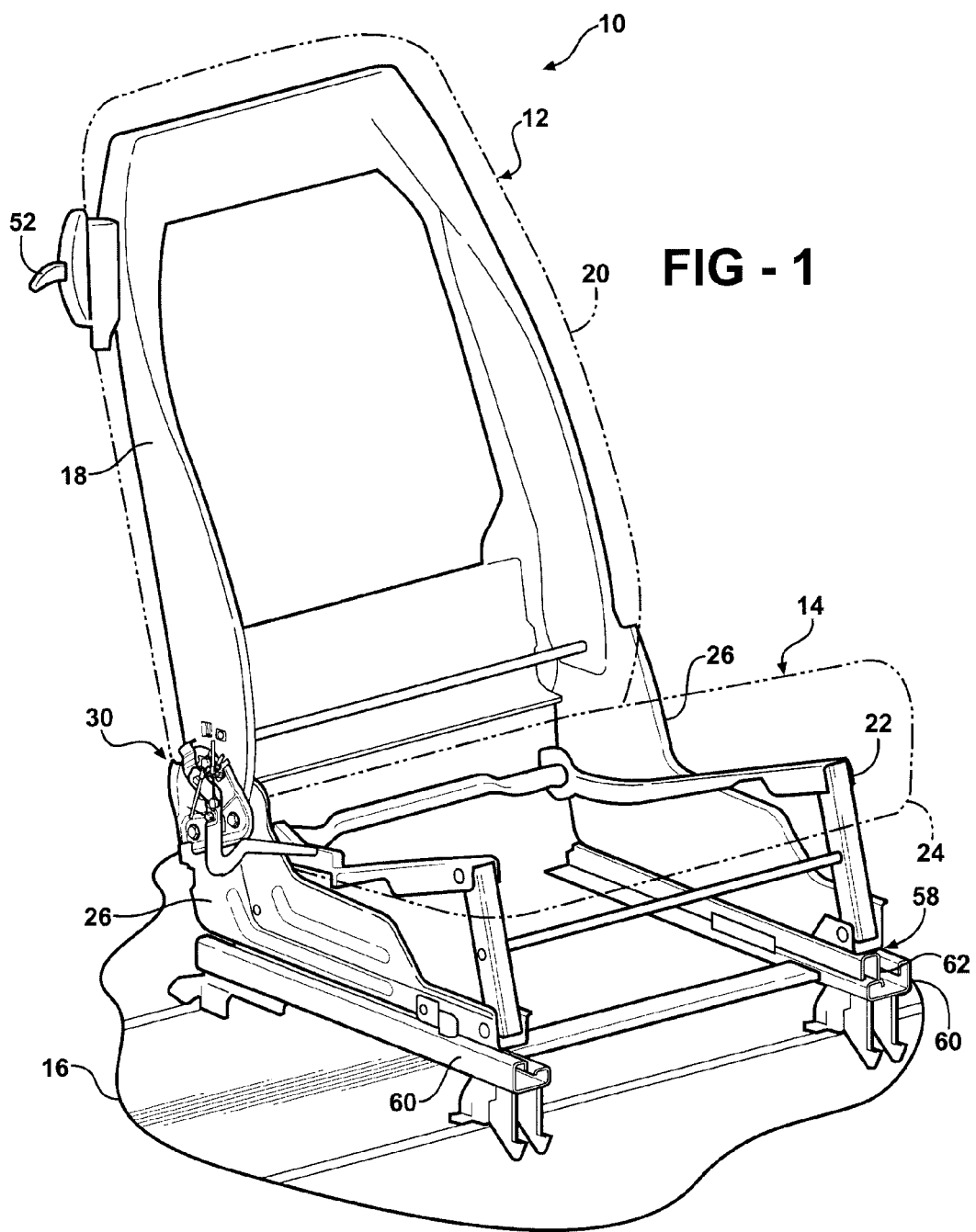
FIG. 1 is a perspective view of a seat assembly including a recliner assembly according to one embodiment of the invention.

Referring to FIG. 1, a vehicle seat assembly is generally shown at 10. The seat assembly 10 includes a seat back 12 and a seat cushion 14, and is adapted for supporting a seat occupant above a vehicle floor 16. The construction of the seat back 12 includes a seat back frame 18 for supporting a contoured pad made of foam, or the like, encased by a trim cover 20, as conventionally known to one skilled in the art, shown in phantom outline. In addition, the construction of the seat cushion 14 includes a seat cushion frame 22 for supporting a contoured pad encased by a trim cover 24, shown in phantom outline. The seat cushion frame 22 is coupled to a pair of seat cushion brackets 26.

Figure 2:
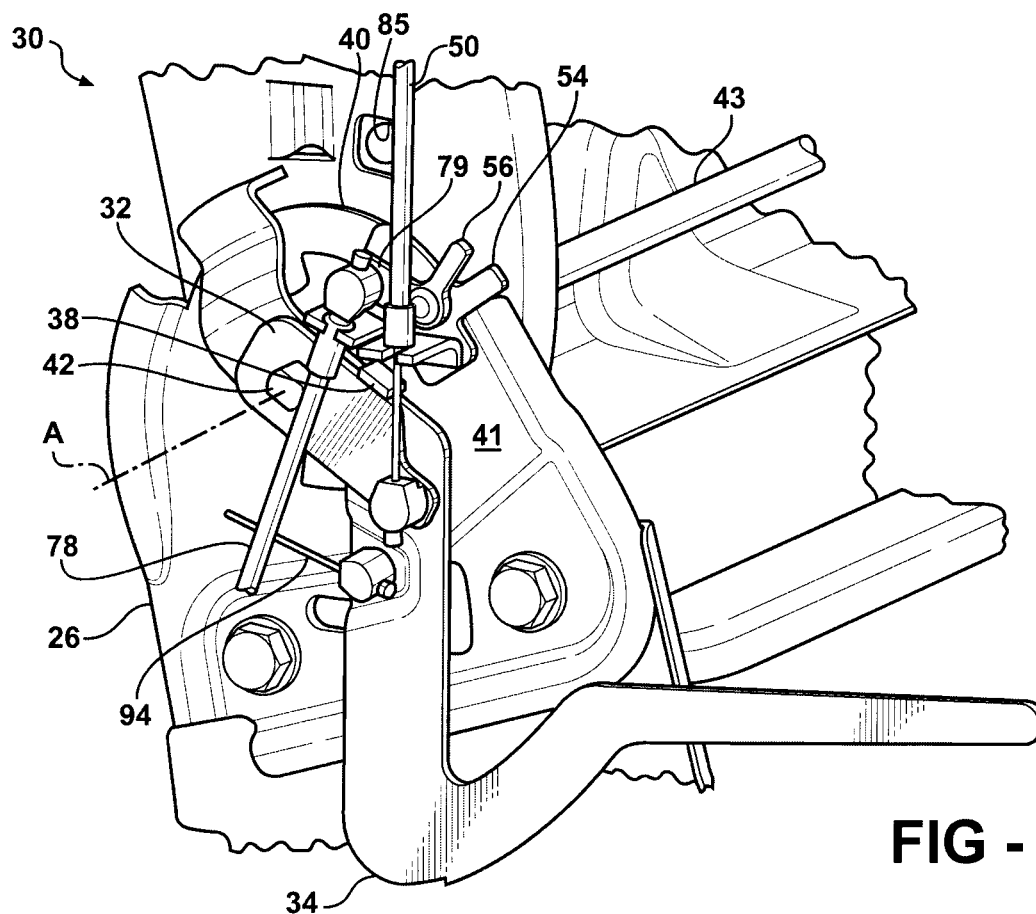
FIG. 2 is a fragmentary, perspective view of the seat assembly illustrating the recliner assembly when a seat back is in an upright seating position.
Figure 9:
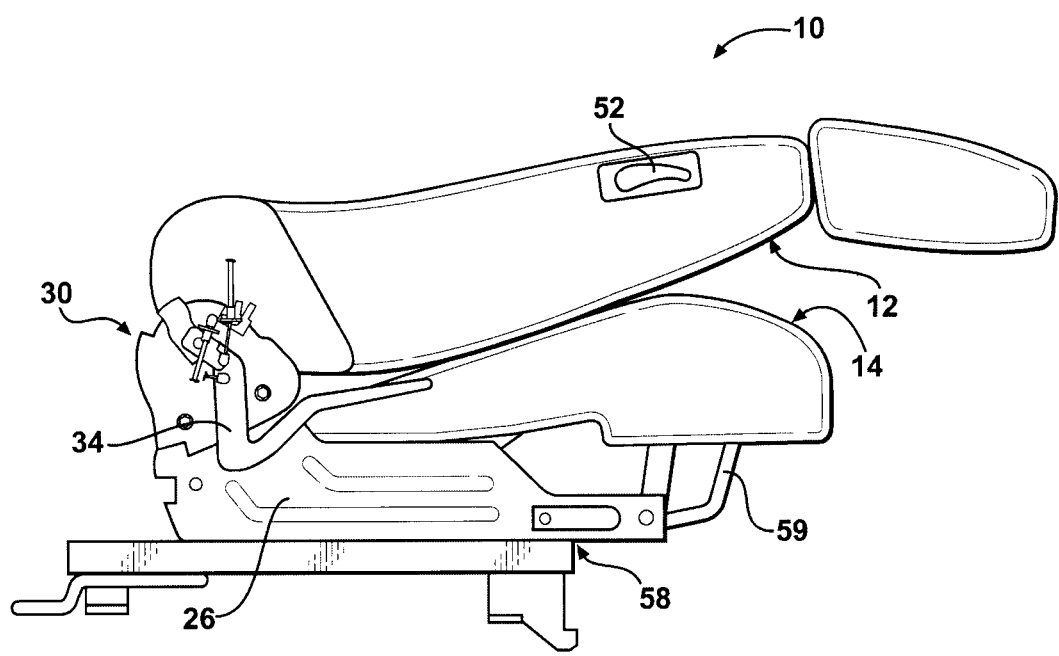
FIG. 9 is a side view of the seat assembly with the seat back in a fold-flat position.

A recliner assembly, generally shown at 30, is provided for allowing selective pivotal or angular adjustment of the seat back 12 relative to the seat cushion 14 about a pivot axis A, shown in FIG. 2. The recliner assembly 30 allows pivotal movement of the seat back 12 relative to the seat cushion 14 between a plurality of reclined seating positions, including an upright seating position, shown in FIGS. 1 and 6A. The recliner assembly 30 also allows pivotal movement of the seat back 12 between any one of the plurality of reclined seating positions and a forward tip-slide or easy-entry position, shown in FIGS. 7A and 8A. Further, the recliner assembly 30 allows pivotal movement of the seat back 12 between any one of the plurality of reclined seating positions or the forward tip-slide position and a fold-flat position wherein the seat back 12 is generally horizontal and overlaying the seat cushion 14, as shown in FIG. 9. The seat back 12 is biased by known means, such as a clock spring, to pivot forwardly towards the forward tip-slide and fold-flat positions.

Figure 2A:
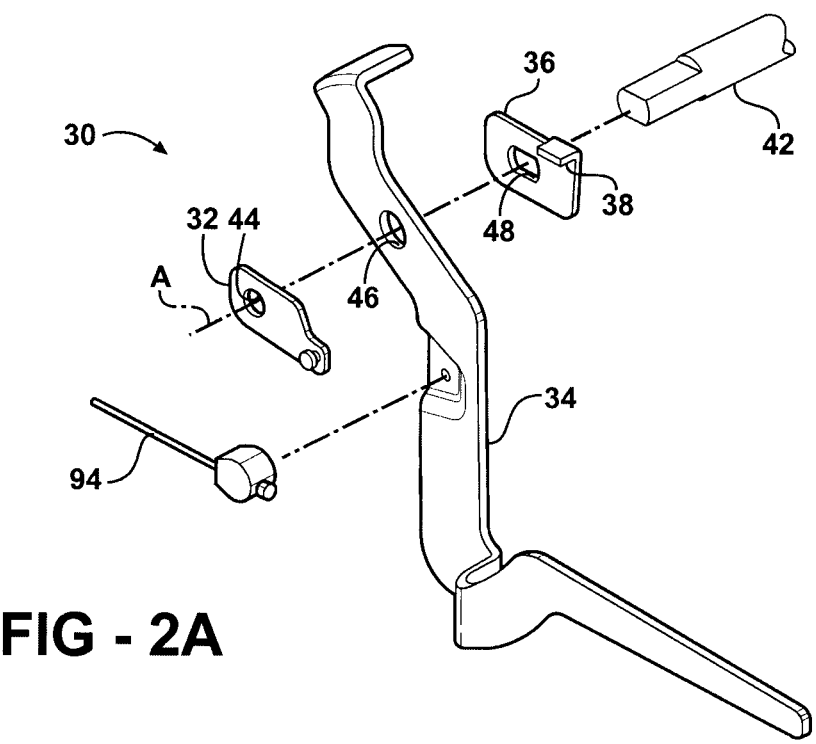
FIG. 2A is an exploded view of a portion of the recliner assembly.

Referring to FIGS. 2 and 2A, the recliner assembly 30 includes a tip release lever 32, a recliner handle 34, a recliner lever 36 having an extended portion 38 extending laterally therefrom, and a pair of disc recliners 40 (one shown) operatively coupled between the seat back frame 18 and the seat cushion brackets 26. The recliner lever 36 is disposed adjacent an outer side 41 of the seat cushion bracket 26 on an outboard side of the seat assembly 10. The recliner handle 34 is disposed adjacent the recliner lever 36 and the tip release lever 32 is disposed adjacent the recliner handle 34. Each disc recliner 40 is operable between a locked configuration in which the seat back 12 is fixed relative to the seat cushion 14 and an unlocked configuration in which the seat back 12 is pivotally moveable relative to the seat cushion 14. Each disc recliner 40 includes a shaft 42 that is co-axial with the pivot axis A and the disc recliners 40 are operatively coupled together by a cross-talk tube 43 for simultaneous actuation thereof, as is well known to one skilled in the art. Rotation of the shafts 42 actuates the disc recliners 40 between the locked configuration and the unlocked configuration. Referring to the disc recliner 40 on the outboard side of the seat assembly 10, the shaft 42 extends laterally through a first opening 44 in the tip release lever 32, a second opening 46 in the recliner handle 34, a third opening 48 in the recliner lever 36, and a fourth opening (not shown) in the corresponding seat cushion bracket 26.

The recliner lever 36 is fixedly coupled to the shaft 42 to cause rotation thereto. The recliner handle 34 and the tip release lever 32 are pivotally coupled to the shaft 42 and each is adapted for selective engagement with the extended portion 38 of the recliner lever 36. More specifically, pivoting the recliner handle 34 in a first direction causes the recliner handle 34 to engage the extended portion 38 of the recliner lever 36, which pivots the recliner lever 36 in the first direction. Pivoting the recliner lever 36 in the first direction causes the shaft 42 to rotate in the first direction, thereby actuating the disc recliners 40 from the locked configuration to the unlocked configuration. Similarly, pivoting the tip release lever 32 in the first direction causes the tip release lever 32 to engage the extended portion 38 of the recliner lever 36, which pivots the recliner lever 36 in the first direction, thereby actuating the disc recliners 40 from the locked configuration to the unlocked configuration, as described above.

A first release cable 50 is operatively interconnected between a tip release handle or easy-entry handle 52 attached to an upper end of the seat back 12 and the tip release lever 32 for pivotally moving the tip release lever 32 in the first direction in response to actuating the tip release handle 52. As described above, pivoting the tip release lever 32 in the first direction causes the tip release lever 32 to engage the extended portion 38 of the recliner lever 36, which in turn actuates the disc recliners 40. Thus, actuation of the disc recliners 40 by the tip release handle 52 is decoupled from actuation of the disc recliners 40 by the recliner handle 34.

The recliner assembly 30 further includes a stop member 54 and a trigger mechanism 56. The stop member 54 is secured to the outer side 41 of the seat cushion bracket 26 on the outboard side of the seat assembly 10 and is angularly disposed along a path of movement of the seat back 12 between the upright seating position and the fold-flat position. The stop member 54 is adapted to restrict forward pivotal movement of the seat back 12 with interference engagement to hold the seat back 12 in the forward tip-slide position, which is angularly disposed between the upright seating position and the fold-flat position, as shown in FIGS. 7A and 8A.

The trigger mechanism 56 is pivotally coupled to the outer side 41 of the seat cushion bracket 26 on the outboard side of the seat assembly 10 and is pivotally moveable between a first position and a second position. In the first position, the trigger mechanism 56 is angularly spaced apart from the stop member 54, as shown in FIGS. 2 and 6B. In the second position, the trigger mechanism 56 is angularly aligned with the stop member 54, as shown in FIG. 7B. To actuate the trigger mechanism 56, the trigger mechanism 56 is pivotally moved from the first position to the second position.

A track assembly, generally shown at 58 in FIG. 1, is operable between a locked condition and an unlocked condition for selective sliding movement of the seat assembly 10 forward and rearward relative to the floor 16. A towel bar 59, shown in FIGS. 6A, 7A, 8A, and 9, is operatively coupled to the track assembly 58 and may be operated by the occupant to actuate the track assembly 58 from the locked condition to the unlocked condition. The trigger mechanism 56 is also operatively connected to the track assembly 58. Actuating the trigger mechanism 56 releases the track assembly 58 from the locked condition to the unlocked condition. The track assembly 58 includes a fixed track member 60 secured to the floor 16, a moveable track member 62 coupled to the seat cushion 14, and a track release system 64, shown in FIG. 3, configured to actuate the track assembly 58 between the locked and unlocked conditions. The moveable track member 62 is slidably coupled to the fixed track member 60 and is adapted to slide forward and rearward along the fixed track member 60 when the track assembly 58 is in the unlocked condition. The moveable track member 62 is biased in a forward direction such that when the track assembly 58 is in the unlocked condition the seat assembly 10 is urged toward a forward position.

The track release system 64 includes a generally L-shaped first plate 66 having a connecting end 68 and a free end 70. The connecting end 68 is pivotally coupled to the moveable track member 62 and the free end 70 has a first distal portion 72 that is bent upwardly. The track release system 64 further includes a second plate 74 operatively in contact with the free end 70 of the first plate 66. The second plate 74 includes a second distal portion 76 that is bent downwardly. A track cable 78 is operatively interconnected between the track release system 64 and the trigger mechanism 56 of the recliner assembly 30 to release the track assembly 58 from the locked condition to the unlocked condition when the trigger mechanism 56 is actuated, which permits the seat assembly 10 to move forward and rearward along the track assembly 58. More specifically, one end of the track cable 78 is coupled to the free end 70 of the first plate 66 and another end of the track cable 78 is coupled to an arm 79 of the trigger mechanism 56 such that pivoting the trigger mechanism 56 from the first position to the second position pulls the track cable 78 and causes the first plate 66 to pivot about the connecting end 68.

Figure 3:
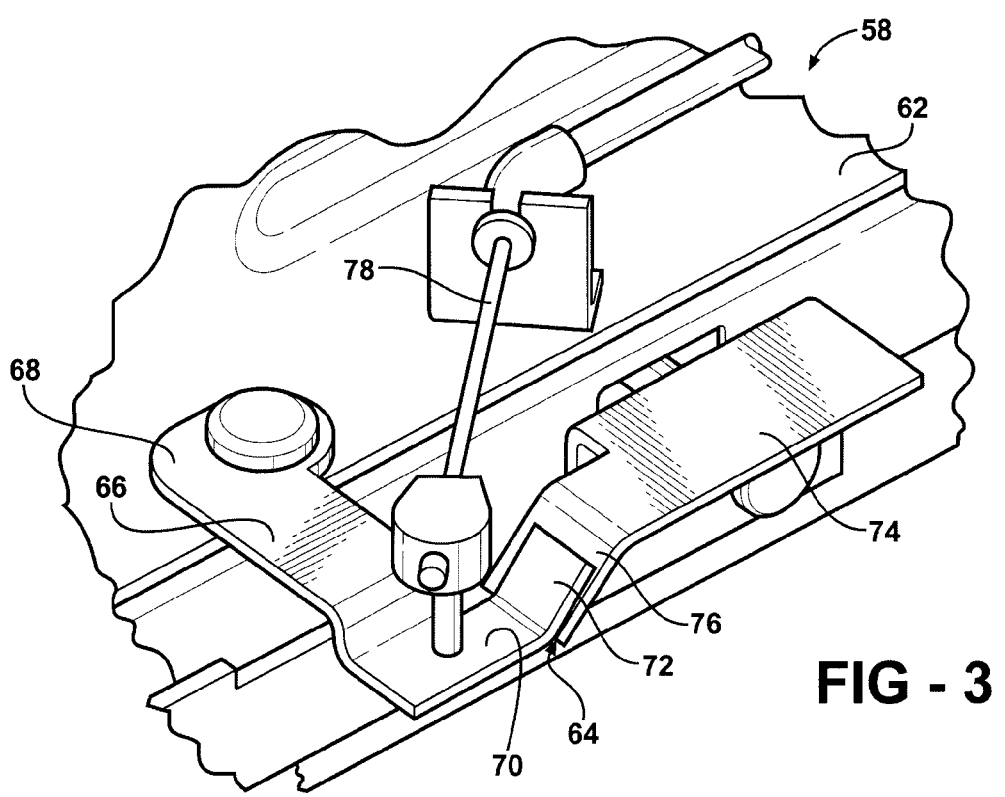
FIG. 3 is a fragmentary, perspective view of a track assembly illustrating a track release system when the track assembly is in a locked condition.

When the track assembly 58 is in the locked condition, the first distal portion 72 of the first plate 66 is adjacent the second distal portion 76 of the second plate 74, as shown in FIG. 3. When the track release system 64 is actuated by pulling the track cable 78, the first plate 66 pivots in a counterclockwise direction (when viewed from FIGS. 3 and 8B) and the first plate 66 pushes the second plate 74 downward, as shown in FIG. 8B. Pushing the second plate 74 downward releases the track assembly 58 from the locked condition to the unlocked condition, which permits the moveable track member 62 to slide forward and rearward relative to the fixed track member 60.

Figure 4:
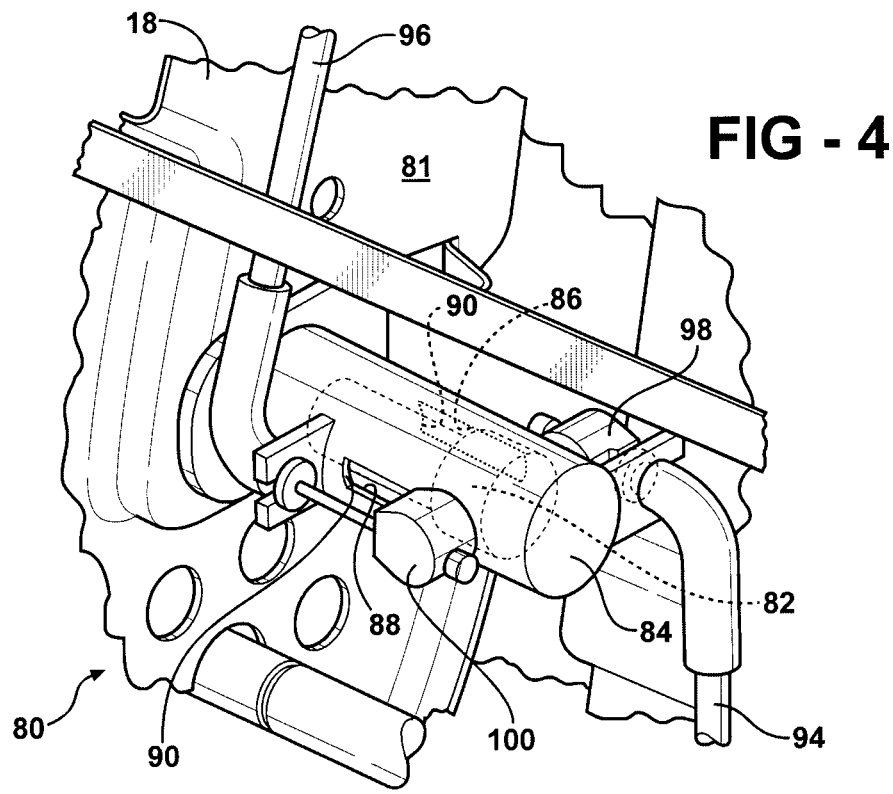
FIG. 4 is a fragmentary, perspective view of a pin mechanism illustrating a pin in a retracted position.
Figure 5:
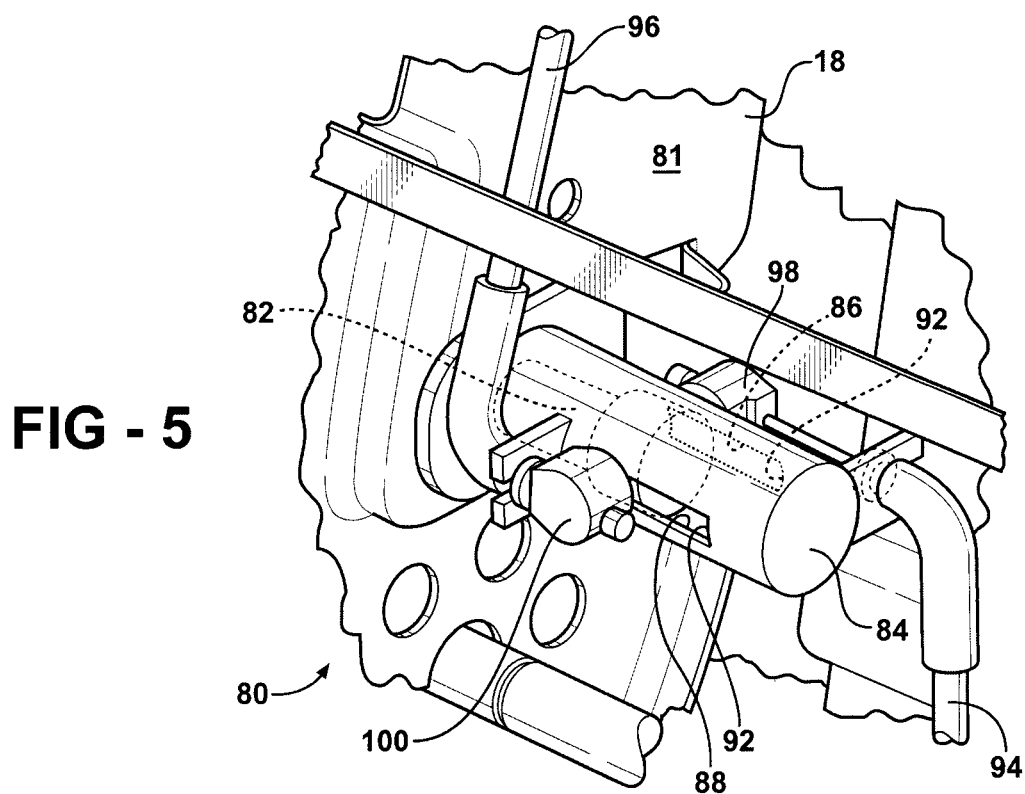
FIG. 5 is a fragmentary, perspective view of the pin mechanism illustrating the pin in an extended position.

Referring to FIGS. 4 and 5, a pin mechanism, generally shown at 80, is coupled to an inner side 81 of the seat back frame 18 on the outboard side of the seat assembly 10. The pin mechanism 80 has a pin 82 moveable between a first or extended position and a second or retracted position and is adapted for selectively engaging the trigger mechanism 56 of the recliner assembly 30 to release the track assembly 58 for forward and rearward movement of the seat assembly 10. The pin 82 is also adapted for selectively engaging the stop member 54 of the recliner assembly 30 to hold the seat back 12 in the forward tip-slide position, which is angularly disposed between the upright seating position and the fold-flat position. The pin mechanism 80 includes a generally tubular pin housing 84 that is fixedly secured to the seat back frame 18 and includes a first slot 86 and a second slot 88 on opposing sides thereof. Each of the first and second slots 86, 88 has a front end 90 generally towards the seat back frame 18, shown in FIG. 4, and a rear end 92 generally away from the seat back frame 18, shown in FIG. 5.

The pin 82 is normally in the extended position. The recliner handle 34 is operatively connected to the pin mechanism 80, such that actuation of the recliner handle 34 causes the pin 82 to move from the extended position to the retracted position. The tip release handle 52 is operatively connected to the pin mechanism 80, such that actuation of the tip release handle 52 causes the pin 82 to move from the retracted position to the extended position. A recliner cable 94 and a second release cable 96 each has a connecting member 98, 100 attached to opposing sides of the pin 82 through the first and second slots 86, 88 of the pin housing 84. The recliner cable 94 is operatively interconnected between the pin 82 and the recliner handle 34 and the second release cable 96 is operatively interconnected between the pin 82 and the tip release handle 52 for cooperatively moving the pin 82 between the retracted and extended positions.

When the pin 82 is in the retracted position, the pin 82 is disposed within the pin housing 84 such that the pin 82 does not extend through an opening 85 in the seat back frame 18, as shown in FIG. 2. In the retracted position, the connecting members 98, 100 are both adjacent to the rear ends 92 of the first and second slots 86, 88 of the pin housing 84, as shown in FIG. 4. Therefore, in the retracted position, the pin 82 does not engage the trigger mechanism 56 or the stop member 54 upon forward pivotal movement of the seat back 12.

When the pin 82 is in the extended position, the pin 82 is extended laterally from the pin housing 84 such that the pin 82 extends through the opening 85 in the seat back frame 18, as shown in FIGS. 6B and 7B. Therefore, in the extended position, the pin 82 engages the trigger mechanism 56 and the stop member 54 upon forward pivotal movement of the seat back 12.

In operation, beginning with the seat back 12 in the upright seating position, shown in FIG. 6A, the seat occupant may lift the recliner handle 34 upwardly to pivotally adjust the seat back 12 between the plurality of reclined seating positions. Lifting the recliner handle 34 causes the recliner handle 34 to engage the extended portion 38 of the recliner lever 36, which in turn causes the shaft 42 to rotate in the first direction and thereby actuates the disc recliners 40 to the unlocked configuration. The seat occupant is now free to pivotally adjust the seat back 12 relative to the seat cushion 14 to any desired reclined seating position. Lifting the recliner handle 34 also pulls the recliner cable 94 which causes the pin 82 to move from the extended position to the retracted position, shown in FIG. 2. Thus, with the pin 82 in the retracted position if the seat occupant is not seated in the seat assembly 10 the seat back 12 may be pivoted forwardly to the fold-flat position without engagement between the pin 82 and the trigger mechanism 56 or the stop member 54. To return the seat back 12 from the fold-flat position, the occupant lifts the seat back 12 until the disc recliners 40 return to the locked configuration with the seat back 12 in the upright seating position.

To move the seat back 12 from the upright seating position, shown in FIG. 6A, or any one of the plurality of reclined seating positions, to the forward tip-slide position, shown in FIG. 8A, the occupant when not seated in the seat assembly 10 pulls the tip release handle 52 upwardly to actuate the first and second release cables 50, 96. The tip release lever 32, in turn, pivots in the first direction in response to actuating the first release cable 50 and engages the extended portion 38 of the recliner lever 36, which causes the recliner lever 36 to pivot in the first direction. Pivoting the recliner lever 36 in the first direction causes the shaft 42 to rotate in the first direction, thereby actuating the disc recliners 40 to the unlocked configuration, which allows forward pivotal movement of the seat back 12. The concurrent actuation of the second release cable 96 causes the pin 82 to move from the retracted position to the extended position whereat the pin 82 extends through the opening 85 in the seat back frame 18 and is in position to engage the trigger mechanism 56, shown in FIG. 6B. With continued forward pivotal movement of the seat back 12, the extended pin 82 drivingly engages the trigger mechanism 56 causing the trigger mechanism 56 to pivot forward until the pin 82 also contacts the stop member 54 and the trigger mechanism 56 is angularly aligned therewith, as shown in FIG. 7B. Contact between the pin 82 and the stop member 54 arrests the forward pivotal movement of the seat back 12 such that the seat back 12 is angularly disposed in the forward tip-slide position between the upright seating position and the fold-flat position, as shown in FIG. 7A. Pivotal movement of the trigger mechanism 56 also pulls the track cable 78 to actuate the track release system 64 to release the track assembly 58 from the locked condition to the unlocked condition. Pulling the track cable 78 causes the first plate 66 to pivot in the counterclockwise direction such that the first plate 66 pushes the second plate 74 downward to release the track assembly 58 from the locked condition to the unlocked condition. In the unlocked condition, the moveable track member 62 is biased in the forward direction to move the seat assembly 10 to the forward position. With the seat back 12 in the forward tip-slide position and the seat assembly 10 in the forward position, space is provided to access a rear storage area or to allow ingress and egress to a rear seat.

To return the seat back 12 to the upright seating position from the forward tip-slide position, the occupant pushes the seat assembly 10 rearward and because the track assembly 58 is in the unlocked condition the seat assembly 10 moves rearward along the track assembly 58 to a rearward position. When the seat assembly 10 reaches the rearward position sliding movement of the seat assembly 10 stops and the seat back 12 pivots rearwardly toward the upright seating position. As the extended pin 82 disengages with the trigger mechanism 56 and the stop member 54, the trigger mechanism 56 returns to the first position, which permits the track cable 78 to relax such that the track release system 64 returns the track assembly 58 to the locked condition. The occupant continues to pivot the seat back 12 rearwardly until the disc recliners 40 return to the locked configuration and the seat back 12 is in the upright seating position, as shown in FIG. 6A.

The seat back 12 may also be moved from the forward tip-slide position, shown in FIG. 8A, to the fold-flat position, shown in FIG. 9. To move the seat back 12 from the forward tip-slide position to the fold-flat position, the occupant lifts the recliner handle 34 upwardly. Lifting the recliner handle 34 pulls the recliner cable 94, which causes the pin 82 to move from the extended position to the retracted position whereat the pin 82 does not extend through the opening 85 in the seat back frame 18 and is disengaged from contact with the stop member 54. When the pin 82 is disengaged from the stop member 54, the seat back 12 is free to pivot forwardly to the fold-flat position wherein the seat back 12 is generally horizontal and overlaying the seat cushion 14, as shown in FIG. 9.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for supporting an occupant above a floor in an automotive vehicle, said seat assembly comprising:
   a seat cushion;
   a seat back coupled to said seat cushion for pivotal movement relative to said seat cushion between a plurality of reclined seating positions and a forwardly folded position;
   a track assembly adapted to be mounted to the floor and coupled to said seat cushion, said track assembly operable between a locked condition and an unlocked condition allowing forward and rearward movement of said seat assembly;
   a recliner assembly operatively coupled between said seat back and said seat cushion, said recliner assembly controlling said pivotal movement of said seat back relative to said seat cushion;
   a stop member fixedly secured to said seat cushion, said stop member engaging said seat back to limit forward pivotal movement of said seat back thereby defining said forwardly folded position; and
   a trigger mechanism pivotally coupled to said seat cushion and operatively coupled to said track assembly, said seat back actuating said trigger mechanism to release said track assembly from said locked condition to said unlocked condition in response to pivoting said seat back to said forwardly folded position, wherein actuating said track assembly to said unlocked condition urges said seat assembly to a forward position and wherein said trigger mechanism pivots from a first position angularly spaced with said stop member to a second position angularly aligned with said stop member in response to pivoting said seat back to said forwardly folded position.

2. A seat assembly as set forth in claim 1 wherein said track assembly includes a track release system to actuate said track assembly between said locked and unlocked conditions, said trigger mechanism and said track release system operatively coupled together with a first cable.

3. A seat assembly as set forth in claim 2 wherein said seat back pivots between said plurality of reclined seating positions and a fold-flat position overlaying said seat cushion, said forwardly folded position angularly disposed between said plurality of reclined seating positions and said fold-flat position.

4. A seat assembly as set forth in claim 3 including a pin mechanism having a pin slidably coupled to said seat back, said pin moveable between an extended position engageable with said trigger mechanism to actuate said trigger mechanism and said stop member to arrest said forward pivotal movement of said seat back in said forwardly folded position and a retracted position allowing said forward pivotal movement of said seat back to said fold-flat position.

5. A seat assembly for supporting an occupant above a floor in an automotive vehicle, said seat assembly comprising:
   a seat cushion;
   a seat back coupled to said seat cushion for pivotal movement relative to said seat cushion between a plurality of reclined seating positions and a fold-flat position overlaying said seat cushion;
   a recliner assembly operatively coupled between said seat back and said seat cushion, said recliner assembly controlling said pivotal movement of said seat back relative to said seat cushion;
   a stop member fixedly secured to said seat cushion, said stop member engaging said seat back to limit forward pivotal movement of said seat back thereby defining a forwardly folded position between said plurality of reclined seating positions and said fold-flat position; and
   a pin mechanism including a pin slidably coupled to said seat back, said pin movable between an extended position engageable with said stop member to arrest said forward pivotal movement of said seat back in said forwardly folded position and a retracted position allowing said forward pivotal movement of said seat back to said fold-flat position.

6. A seat assembly as set forth in claim 5 including a track assembly adapted to be mounted to the floor and coupled to said seat cushion, said track assembly operable between a locked condition and an unlocked condition allowing forward and rearward movement of said seat assembly.

7. A seat assembly as set forth in claim 6 including a trigger mechanism pivotally coupled to said seat cushion and operatively coupled to said track assembly, said seat back actuating said trigger mechanism to release said track assembly from said locked condition to said unlocked condition in response to pivoting said seat back to said forwardly folded position, wherein actuating said track assembly to said unlocked condition urges said seat assembly to a forward position.

8. A seat assembly as set forth in claim 4 or 7 wherein said recliner assembly includes a disc recliner having a recliner shaft, wherein rotation of said recliner shaft actuates said disc recliner between a locked configuration fixing said seat back relative to said seat cushion and an unlocked configuration allowing said pivotal movement of said seat back.

9. A seat assembly as set forth in claim 8 including a recliner lever fixedly secured to said recliner shaft, a recliner handle pivotally coupled to said recliner shaft and engageable with said recliner lever during rotation of said recliner handle in a first direction to actuate said disc recliner to said unlocked condition, and a release lever pivotally coupled to said recliner shaft and engageable with said recliner lever independent of said recliner handle during rotation of said release lever in said first direction to actuate said disc recliner to said unlocked condition.

10. A seat assembly as set forth in claim 9 including a release handle mounted to said seat assembly and operatively coupled to said release lever and said pin, wherein operation of said release handle rotates said release lever in said first direction to actuate said disc recliner to said unlocked condition allowing said forward pivotal movement of said seat back and simultaneously moves said pin from said retracted position to said extended position to engage with said trigger mechanism to actuate said trigger mechanism and said stop member to arrest said forward pivotal movement of said seat back in said forwardly folded position.

11. A seat assembly as set forth in claim 10 including a second cable operatively coupling said recliner handle and said pin, wherein rotation of said recliner handle in said first direction moves said pin from said extended position to said retracted position to allow said forward pivotal movement of said seat back to said fold-flat position.

12. A seat assembly as set forth in claim 11 including a third cable operatively coupling said release handle and said release lever and a fourth cable operatively coupling said release handle and said pin.

13. A seat assembly as set forth in claim 12 wherein said pin mechanism includes a housing fixedly secured to said seat back, said housing having first and second slots on opposing sides thereof, said pin slidably disposed in said housing and movable between said extended and retracted positions.

14. A seat assembly as set forth in claim 13 wherein said second cable is coupled to said pin through said first slot and said fourth cable is coupled to said pin through said second slot.

* * * * *